Dec. 12, 1950 W. E. NEWMAN 2,533,608
PNEUMATIC VALVE

Filed June 27, 1947 2 Sheets-Sheet 1

Inventor
WALDO E. NEWMAN

By McMorrow, Berman + Davidson
Attorneys

Dec. 12, 1950 W. E. NEWMAN 2,533,608
PNEUMATIC VALVE
Filed June 27, 1947 2 Sheets-Sheet 2

Inventor
WALDO E. NEWMAN
By
McMorrow, Berman + Davidson
Attorney

Patented Dec. 12, 1950

2,533,608

UNITED STATES PATENT OFFICE 2,533,608

PNEUMATIC VALVE

Waldo Emerson Newman, Toledo, Ohio

Application June 27, 1947, Serial No. 757,406

4 Claims. (Cl. 251—26)

This invention relates to improvement in valves, and more particularly to a manually operated pneumatic valve for controlling the flow of compressed air or other pressure fluid to a fluid pressure operated device such as a pneumatic tool, as exemplified by air hammers and wrenches, paint spray guns, air sanders and similar devices.

It is among the objects of the invention to provide an improved manually-controllable valve arranged for fine adjustment to accurately control the rate of flow of compressed air or other fluids through the valve and for rapid, broad adjustment to quickly open or close the valve or make a broad adjustment in the rate of flow of fluid through the valve, which valve is of small size so that it may conveniently be mounted on the handle of a pneumatic tool for operation by the thumb of the person holding the tool, is of light weight so that it does not materially increase the weight of the tool, requires no substantial modification of the tool for its installation, is of extreme accuracy in controlling the volumetric rate of flow of fluid to the tool, and is simple in construction and economical to manufacture.

Other objects and advantages will become apparent from a consideration of the following description in conjunction with the accompanying drawings, wherein.

Figure 2:
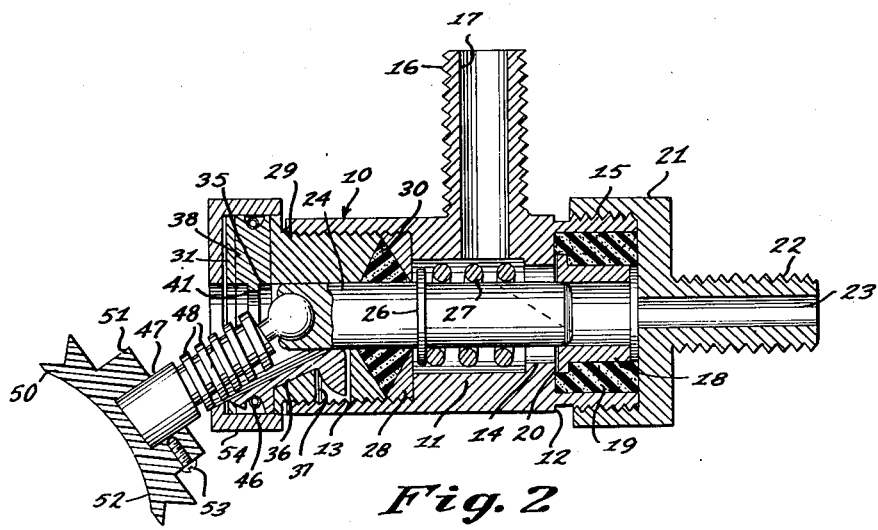
Figure 2 is a longitudinal cross-section through the valve illustrated in Figure 1 showing the valve parts in one operative condition.
Figure 4:
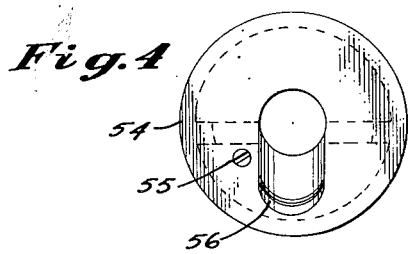
Figure 4 is an end elevation of the left-hand end of the valve as illustrated in Figure 1 with the control knob and screw shaft removed.
Figure 5:
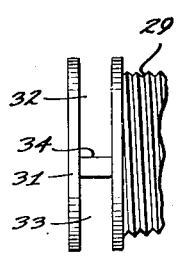
Figure 5 is a side elevation of a fragmentary portion of an end plug constituting an operative component of the valve.

With continued reference to the drawings, the somewhat elongated, tubular, cylindrical valve body, generally indicated at 10 has a substantially concentric bore 11 intermediate the end portions thereof, a counterbore 12 in the right-hand end portion thereof as illustrated in Figure 2, a counterbore 13 in the opposite end portion thereof longer than the counterbore 12 and provided with internal screw threads, an internal annular shoulder 14 at the end of the bore 11 adjacent the counterbore 12, external screw threads 15 overlying the counterbore 12, and a fluid conduit coupling 16 having a bore 17 extending therethrough and communicating with the bore 11 internally of the valve body 10. A tubular bushing 18 is resiliently supported in the counterbore 12 by a sleeve 19 of resilient material such as soft or sponge rubber. The bushing 18 is held substantially co-axial with the bore 11 of the valve body and is provided at its inner end with an external flange 20 which provides an end bearing for the bushing against the adjacent face of the internal annular shoulder 14. The length of the bushing 18 is made slightly less than the length of the counterbore 12 so that the bushing will have a limited freedom of movement in the counterbore in order that it may be aligned with a valve plunger later to be described.

An end-closure cap 21 is secured on the end of the body 10 by being threaded onto the external screw threads 15 and is provided with a fluid conduit coupling 22 having a bore 23 which communicates with the interior of the bushing 18. The fluid passage between the coupling 16 and the coupling 22 is through the bushing 18 and through the aperture of internal shoulder 14 and the adjacent end portion of bore 11 of the valve body. This fluid passage is controlled by a valve plunger 24 of cylindrical shape having one end engaged in the bushing 18 and provided with a radial groove 25 the bottom of which is inclined from a position at the end of the plunger spaced from one side thereof to a position at the opposite side of the plunger spaced from the end of the plunger. The width, depth, length and bottom inclination of the groove 25 may be varied to provide different rates of control for the flow of fluid through the valve. When the grooved end of the plunger is received in the bushing 18 to an extent such that the groove 25 is wholly contained in the bushing the fluid passage between the couplings 16 and 22 is cut off and as the plunger is moved outwardly of the bushing this fluid passage is variably restricted depending upon the extent of longitudinal movement of the plunger.

An annular shoulder 26 surrounds the plunger 24 intermediate its length and a coiled compression spring 27 surrounds the plunger between the shoulder 26 and the internal shoulder 14 of the valve body and resiliently urges the plunger in a direction to open the fluid passage between the couplings 16 and 22. The grooved end of the plunger fits the interior of bore of bushing 18 with a close, sliding fit, which provides a substantially fluid-tight seal between the end portion of the plunger and the bushing, except for the fluid passage provided through the groove 25.

A packing ring 28 having a concave beveled side is positioned in the inner end of the longer, internally-screw-threaded counterbore 13 and a tubular plug 29 having an axial bore receiving the end portion of plunger 24 on the opposite side of shoulder 26 from the grooved end of the plunger is threaded into the counterbore 13. Plug 29 has a concave beveled end facing the beveled packing ring 28 and a packing 30 of resilient material is compressed between the plugs and the packing ring around the plunger 24 to prevent escape of fluid from the valve bore 11 into the bore of the plug 29.

The plug 29 has an enlarged cylindrical head 31 positioned immediately beyond the corresponding end of the valve body 10 at the outer end of the counterbore 13 and this head is provided with an upper transverse slot 32 and a lower transverse slot 33. The upper slot 32 is substantially semi-circular in extent and the lower slot has an extent less than the semi-circular area of the head by the width of the connector 34 passing between the slots 32 and 33. The outer end of the bore 35 of the plug is provided with a tapered lateral extension 36, the other side of which is inclined from a position displaced from the plug bore at the outer end of the plug to a position merging with the plug bore intermediate the plug length and a radially-disposed hole 37 is provided in the plug adjacent the location at which the tapered lateral enlargement of the bore merges into the bore.

Figure 6:
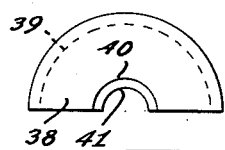
Figure 6 is a front elevation of a thread block constituting an operative component of the valve.
Figure 7:
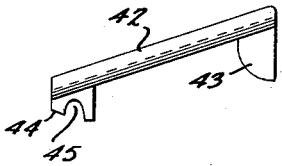
Figure 7 is a side elevation of a pressure arm constituting an operative component of the valve.
Figure 8:
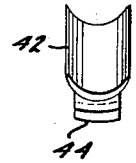
Figure 8 is an end elevation of the pressure block illustrated in Figure 7 looking at the left-hand end of the pressure block as shown in Figure 7.
Figure 9:
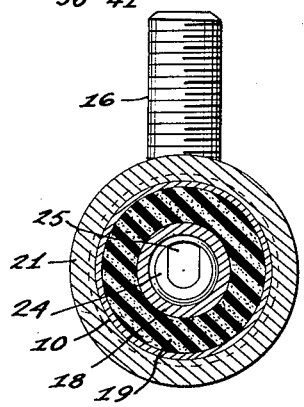
Figure 9 is a transverse cross-section on the line 9—9 of Figure 3.
Figure 10:
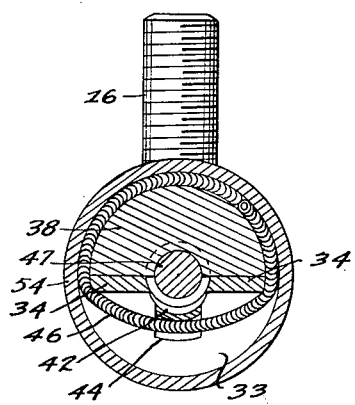
Figure 10 is a transverse cross-section on the line 10—10 of Figure 3.

A thread block 38, particularly illustrated in Figure 6, of semi-circular shape, is slidably mounted in the slot 32 of the plug head and is provided in its outer edge with a groove 39 and in its straight edge with a semi-circular recess 40 within which is disposed a single thread section 41.

An elongated, concave pressure arm 42 is disposed in the bore enlargement 36 and has projecting from one end thereof a rounded knob 43 which is pivotally received in the inner end of the hole 37 in the plug 29. An extension 44 at the end of the arm 42 opposite the knob 43 provides a groove 45 which is generally opposed to the groove 39 in the thread block 38. The arm 42 is longitudinally straight, but is transversely concave-convex, the curvatures of the inner and outer sides having radii both of which are substantially equal in length to the radius of the bore 35 of the plug.

A circular or loop garter spring 46 surrounds the thread block 38 and pressure arm 42 being located in the grooves 39 and 45 and resiliently urges the outer end of the pressure arm 42 inwardly to a position in which the inner concave surface of the pressure arm constitutes a smooth continuation of the bore 35 of the plug 29, the pressure arm being movable outwardly in the bore enlargement 36 against the force of spring 46 for a purpose which will presently appear.

A screw shaft 47 having substantially square screw threads 48 on the exterior thereof extends through the plug head 31 and is universally secured at its inner end to the adjacent end of plunger 24 by having a ball 49 on the end thereof secured in a beaded-over, partly spherical concavity provided in the adjacent end of the plunger.

A knob 50 having an apertured cylindrical base 51 and a concave outer face 52 is secured on the outer end of screw shaft 47 by suitable means, such as the set screw 53 extending through the base 51 and bearing at its inner end against the side of the end portion of the screw shaft received in the recessed base of the knob.

Figure 1:
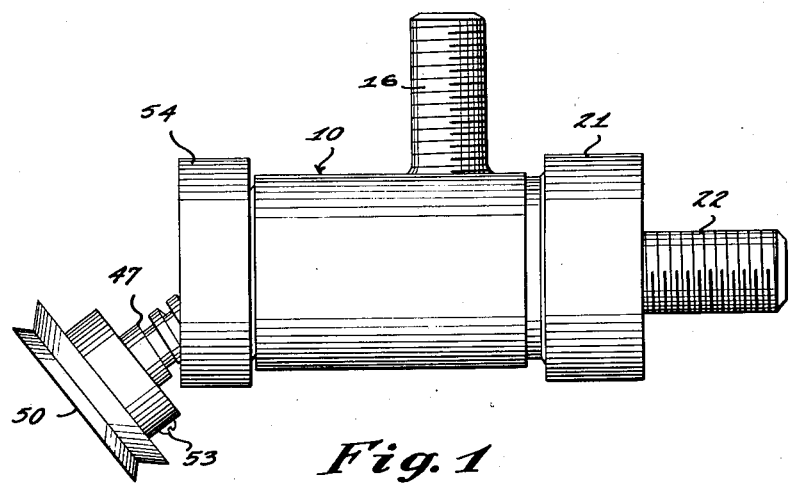
Figure 1 is a side elevation of a manually-operated valve illustrative of the invention.

A cylindrical, cup-shaped end-closure cap 54 is fitted over the head portion 31 of the plug 29 and secured in place by suitable means such as a screw 55 extending through an aperture in the end wall of the cap and into the outer end of the plug. The closure cap has an elongated opening 56 in the end wall thereof through which the screw shaft 47 passes and in which the screw shaft is movable between the position shown in Figure 3 in which it is within the bore 35 of the plug and the position shown in Figure 1 in which it is in the bore enlargement 36.

Figure 3:
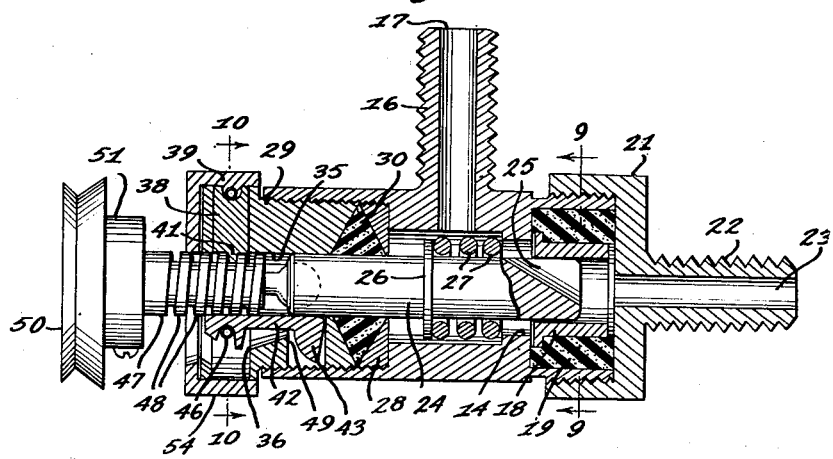
Figure 3 is a longitudinal cross-section similar to Figure 2 showing the valve parts in a different operative position.

With the screw shaft in the position shown in Figure 3 in which its threads 48 are in engagement with the thread section 41 on the thread block 38 rotation of the knob 50, by rotating the screw shaft 47, will thread the screw shaft along the thread section 41 and impart to the valve plunger 24 a very gradual longitudinal movement for fine adjustment of the valve opening so that the flow rate of pressure fluid flowing through the valve can be accurately controlled. With the valve operatively mounted on a tool handle in position such that the concave outer face of knob 50 is in convenient reach of the thumb of a person holding the tool handle and with the thread block 38 at the side of the valve adjacent the handle, inward movement of the upper or lower rim portion of the knob by the tip of the thumb will rotate the screw shaft against the thread block to obtain fine adjustment of the valve. With the valve in the indicated operative position an outward movement of the knob 50 by the thumb of the operator will force the pressure arm and the screw shaft outwardly into the bore enlargement 36 and release the thread 48 of the screw shaft from the thread section 41 of the thread block, freeing the screw shaft and the plunger for longitudinal movement by pressure of the thumb upon the end of the knob. Thumb pressure sufficient to overcome the force of spring 27 will move the plunger in a valve-closing direction and thumb pressure less than the force of spring 27 will permit the spring to move the plunger in a valve-opening position. Thus, broad changes in the valve setting may be quickly made or the valve may be completely opened or closed, if desired. When the valve has been brought to a condition of approximate adjustment with the screw shaft released from the screw thread block, the shaft may be re-engaged with the block and a fine adjustment made by rotation of the knob in the manner indicated above. There is thus provided a valve having a rapid broad adjustment and a slow, micro or vernier adjustment so that the rate of flow of fluid through the valve can be quickly and accurately controlled.

The present valve may be used either in series with or in substitution of the finger or trigger-operated control valve conventionally provided in fluid-pressure-operated devices of the character indicated above and may be applied to existing structures and incorporated as original equipment in new structures with equal facility.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A manually-operated valve for controlling the rate of flow of pressure fluid to a fluid-operated device comprising a cylindrical body having a bore in the intermediate portion thereof, counterbores of unequal length, one in each end portion thereof, an annular, internal shoulder in the end of said bore at the shorter counterbore, internal screw threads in the longer counterbore, external screw threads overlying said shorter counterbore, and a conduit coupling projecting therefrom and having a bore communicating with the bore in said body; a cylindrical bushing in said shorter counterbore; a resilient sleeve surrounding said bushing within said counterbore and bonded to said body and said bushing; an end-closure cap threaded onto said external body threads and having a conduit coupling extending therefrom the bore of which communicates with the interior of said bushing at the outer end thereof; a beveled packing ring in the inner end portion of said longer counterbore; an internally-screw-threaded plug threaded into said longer counterbore having an axial bore therethrough of the same size as the bore in said bushing, a concavely beveled inner end facing said beveled packing ring, a cylindrical head with substantially semi-circular, radial slots therein disposed beyond the outer end of said counterbore, a lateral enlargement of said bore inclined inwardly from the outer end of said head, and a radial hole adjacent the inner end of said bore enlargement; a thread block having a groove around its outer edge and a single thread section around its inner edge slidably mounted in a slot in the head portion of said plug and disposed opposite said bore enlargement; a pressure arm mounted in said bore enlargement transversely curved on arcs having a radius substantially equal to the radius of said bore and having at its inner end a projecting knob pivotally received in said radial hole in said plug, and an external groove at its opposite end disposed opposite the groove in said thread block; a garter spring surrounding said thread block and said pressure arm within said groove resiliently urging the outer end of said pressure arm toward said bore; an apertured resilient packing in said longer counterbore between said packing ring and the inner end of said plug; a cylindrical valve plunger extending through the bore in said body, a portion of the bore in said plug, said packing, and a portion of the bore in said bushing and having an external annular shoulder engageable with said packing ring to limit valve-opening movement thereof, and an inclined, radial groove in the end portion thereof received in said bushing; a compression spring surrounding said plunger between said internal body shoulder and said external plunger shoulder urging said plunger away from said bushing and toward the head of said plug; a screw shaft having substantially square screw threads thereon universally connected at its inner end to the end of said plunger within said plug and extending between said thread block and said pressure arm to a position beyond the outer end of said plug head; a knob having a concave outer end fixed to the outer end of said screw shaft to rotate said screw shaft against the thread of said thread block for fine adjustment of said valve and to move said screw shaft away from said thread and imparting a rapid sliding movement to said valve plunger; and an end-closure cap secured over said plug head and having an elongated opening therein for said screw shaft.

2. A manually-operated valve for controlling the rate of flow of pressure fluid to a fluid-operated device comprising a tubular valve body having a counterbore in each end portion thereof, an internal annular shoulder at the inner end of one of said counterbores and a fluid conduit coupling communicating with the space in said body between said counterbores; a tubular bushing resiliently supported in said one counterbore and sealed to said body against fluid leakage; an end-closure cap on said body covering the outer end of said one counterbore and having a fluid conduit coupling communicating with the interior of said bushing; a tubular plug in the other of said counterbores having a transversely slotted head at the corresponding end of said body and a lateral bore enlargement inclined inwardly from the outer face of said head; a plunger in said body having one end adjacent said bushing and provided with an inclined radial groove variably restricted by said bushing upon longitudinal movement of said plunger to control the rate of fluid flow through said valve; means in said body resiliently urging said plunger toward valve-opening position; a screw shaft universally connected at its inner end to the end of said plunger opposite said groove; a thread block in said slotted plug head having a thread section engageable with said screw shaft threads; a pressure arm in said plug bore enlargement bearing against said screw shaft opposite said thread block, spring means engaging the outer end of said pressure arm resiliently holding said screw shaft against said thread block; and a thumb knob on the outer end of said screw shaft for rotating said screw shaft against the thread of said thread block or disengaging said screw shaft from said thread and imparting longitudinal movement thereto.

3. A manually-operated valve for controlling the rate of fluid flow to a fluid-operated device comprising a tubular valve body having a fluid conduit coupling communicating with the internal bore between the end portions thereof; a tubular bushing resiliently supported in one end of said body; an end-closure cap covering said one end of said body and having a fluid conduit coupling communicating with the interior of said bushing; a tubular plug in the other end of said body having a transversely slotted outer end portion and a lateral bore enlargement tapering inwardly from the outer end thereof; a valve plunger slidable in said body having one end slidably received in said tubular bushing, said plunger having in said one end an inclined radial groove variably restricted by said bushing to control the rate of fluid flow through said valve; a screw shaft universally connected at its inner end to the end of said plunger opposite said groove and extending through the bore of said plug; a thumb knob on the outer end of said screw shaft; a thread block in the transversely slotted outer end portion of said plug engageable with said screw shaft; means, including a pressure arm pivotally secured in the bore enlargement of said plug, resiliently forcing said screw shaft against said thread block; and a packing surrounding said plunger at the inner end of said plug.

4. A manually-operated valve for controlling the flow rate of pressure fluid to a fluid-pressure operated device comprising a tubular valve body having a substantially axial bore and a fluid conduit coupling communicating with said bore intermediate the end portions of said body, a fluid conduit coupling at one end of said body communicating with said bore, a bushing in said one end of said bore, a valve plunger in said body between said coupling means and having one end slotted and slidably disposed in said bushing to variably restrict the fluid passage between said couplings upon lengthwise movement of said plunger, a screw shaft universally connected with the opposite end of said plunger and extending beyond the corresponding end of said body, a knob on the outer end of said screw shaft, a thread carried by said body and engageable with the threads of said screw shaft for imparting longitudinal movement to said plunger upon rotation of said knob, and means resiliently holding said universally connected screw shaft in engagement with said thread, the opening through which said screw shaft extends beyond the corresponding end of said body being larger than said screw shaft whereby said screw shaft is manually releasable from said thread for direct longitudinal movement of said plunger by said knob.

WALDO EMERSON NEWMAN.

REFERENCES CITED

The following references are of record in the file of this patent:

UNITED STATES PATENTS

| Number | Name | Date |
|--------|------|------|
| 966,672 | Ellison | Aug. 9, 1910 |
| 2,061,743 | Tear | Nov. 24, 1936 |